US012693882B2

(12) United States Patent
Graham

(10) Patent No.: US 12,693,882 B2
(45) Date of Patent: Jul. 28, 2026

(54) OPTIMIZED CREATION OF IDENTITY INFORMATION FOR PROVISIONED VIRTUAL MACHINES

(71) Applicant: Citrix Systems, Inc., Ft. Lauderdale, FL (US)

(72) Inventor: Simon Piers Graham, Bolton, MA (US)

( * ) Notice: Subject to any disclaimer, the term of this patent is extended or adjusted under 35 U.S.C. 154(b) by 411 days.

(21) Appl. No.: 17/857,811

(22) Filed: Jul. 5, 2022

(65) Prior Publication Data
US 2024/0012665 A1     Jan. 11, 2024

(51) Int. Cl.
| | |
|---|---|
| *G06F 9/455* | (2018.01) |
| *G06F 21/53* | (2013.01) |
| *G06F 21/57* | (2013.01) |
| *G06F 21/60* | (2013.01) |

(52) U.S. Cl.
CPC .......... *G06F 9/45558* (2013.01); *G06F 21/53* (2013.01); *G06F 21/57* (2013.01); *G06F 21/602* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 9,652,265 B1 * | 5/2017 | Narayanasamy | ....... G06F 13/10 |
| 9,720,719 B2 | 8/2017 | Graham | |
| 2013/0343170 A1 * | 12/2013 | Kuraoka | ................ G11B 7/007 |
| | | | 369/47.37 |
| 2014/0258733 A1 * | 9/2014 | Scott-Nash | ......... G06F 12/1408 |
| | | | 713/190 |
| 2018/0145884 A1 * | 5/2018 | Stefanov | ................. H04L 67/10 |
| 2021/0117330 A1 * | 4/2021 | Lu | ........................ G06F 12/0868 |
| 2023/0115278 A1 * | 4/2023 | Turner | ................ G06F 11/1469 |
| | | | 718/1 |

* cited by examiner

*Primary Examiner* — Wynuel S Aquino

(57) ABSTRACT

A system and method for initializing a virtual machine (VM) image is provided. The method includes steps of retrieving identity data from a metadata service implemented by a cloud environment; obtaining, from the cloud environment, a virtual identity disk assigned to a VM; and writing the identity data to the virtual identity disk assigned to the VM. The method may further comprise encrypting the identity data with a data encryption key (DEK) or a public key of a virtual trusted platform module (vTPM) responsive to the vTPM being available.

15 Claims, 14 Drawing Sheets

Provisioning Identity using MetaData Service and vTPM

500

504

604

606

900

Digital Workspace Server
902

Server Virtualization Agent
922

DDC
106

Broker
924

Network
904

Endpoint
906

Digital Workspace
910

Workspace
Applications
912

Client Virtualization Agent
920

Application Servers
908

SaaS
Application
914

Web
Application
916

Enterprise
Application
918

OPTIMIZED CREATION OF IDENTITY INFORMATION FOR PROVISIONED VIRTUAL MACHINES

BACKGROUND

When generating a large number of virtual machines (VMs), such as Virtual Delivery Agents (VDAs), a desktop delivery controller (DDC) may create a VM image once, and then a cloud computing service may replicate the image multiple times to generate many essentially identical VMs. In particular, each newly provisioned VM can execute an exact copy of the original VM image. In many cases, when a respective VM is rebooted, it may be reset to its golden master image state, corresponding to the VM image.

When provisioning VMs at scale from a common image, each VM must have a unique identity, for example a hostname, and a record in an Active Directory. In order to access the Active Directory, it may be necessary for the VM to possess a unique password associated to the respective VM's hostname. Likewise, it may be necessary for the VM to possess secrets used to protect the VM's identity, so as to prevent spoofing. Accordingly, it is necessary to create and upload unique identity information, such as the hostname, secrets, and password, for each provisioned VM. Moreover, the identity information should be securely accessible and updatable by the VM at run time, without requiring hypervisor or public cloud service credentials. Transferring the identity data may be accomplished by creating and uploading a virtual disk formatted as New Technology File System (NTFS) containing the identity information in directories protected by access control lists (ACLS).

SUMMARY

In at least one example, a method of initializing a virtual machine (VM) image is provided. The method can comprise retrieving identity data from a metadata service implemented by a cloud environment. The method can further comprise obtaining, from the cloud environment, a virtual identity disk assigned to a VM. The method can further comprise writing the identity data to the virtual identity disk assigned to the VM.

At least some examples of the method can include one or more of the following features. The method can further comprise encrypting the identity data.

In the method, encrypting the identity data can comprise encrypting the identity data with a data encryption key (DEK).

The method can further comprise creating the DEK. The method can further comprise storing a first copy of the DEK in a registry entry of the VM image. The method can further comprise storing, within a location accessible by a delivery controller, a second copy of the DEK in association with the VM image. Encrypting the identity data with the DEK can comprise encrypting, by the delivery controller, the identity data using the second copy of the DEK. The method can further comprise storing, by the delivery controller, the encrypted identity data in the metadata service. The method can further comprise obtaining, by the VM during a boot, the first copy of the DEK from the registry entry. Retrieving the identity data from the metadata service can comprise retrieving, by the VM, the encrypted identity data from the metadata service. The method can further comprise decrypting, by the VM and during the boot, the encrypted identity data. Writing the identity data to the virtual identity disk can comprise writing the decrypted identity data to the virtual identity disk.

In the method, encrypting the identity data can comprise encrypting the identity data using a public key of a virtual trusted platform module (vTPM).

In the method, encrypting the identity data using the public key of the vTPM can comprise encrypting, by a delivery controller, the identity data using the public key of the vTPM. The method can further comprise enrolling, by the delivery controller and with the cloud environment, the vTPM for the VM. The method can further comprise obtaining, by the delivery controller and from the cloud environment, the public key of the vTPM. The method can further comprise storing, by the delivery controller, the encrypted identity data in the metadata service for the VM. The method can further comprise, responsive to the virtual identity disk being empty during a boot of the VM, instructing, by the VM, the vTPM to decrypt the data.

In the method, encrypting the identity data using the vTPM can comprise checking for availability of the vTPM. Encrypting the identity data using the vTPM can further comprise, responsive to the vTPM being available, using the vTPM.

In the method, the identity data can comprise a password associated with an account of the VM and/or a unique hostname of the VM.

The method can further comprise creating the virtual identity disk. The method can further comprise confirming that the virtual identity disk is empty. The method can further comprise formatting the virtual identity disk.

The method can further comprise transmitting the identity data to the metadata service.

The method can further comprise instructing a directory service to change a password associated with an account of the VM.

In at least one example, a computer system configured to initialize a VM image is provided. The computer system can comprise a memory and at least one processor coupled to the memory. The at least one processor can be configured to obtain, from a cloud environment, a virtual identity disk assigned to a VM. The VM can be configured to retrieve identity data from a metadata service implemented by the cloud environment. The VM can be further configured to write the identity data to the virtual identity disk assigned to the VM.

At least some examples are directed to a non-transitory computer readable medium storing executable instructions to initialize a VM image. In these examples, the instructions can be encoded to execute any of the acts of the method of initializing a VM image described above. For example, the instructions can include instructions to retrieve identity data from a metadata service implemented by a cloud environment. The instructions can further include instructions to write the identity data to a virtual identity disk assigned to a VM, wherein a delivery controller is configured to obtain, from the cloud environment, the virtual identity disk assigned to the VM.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
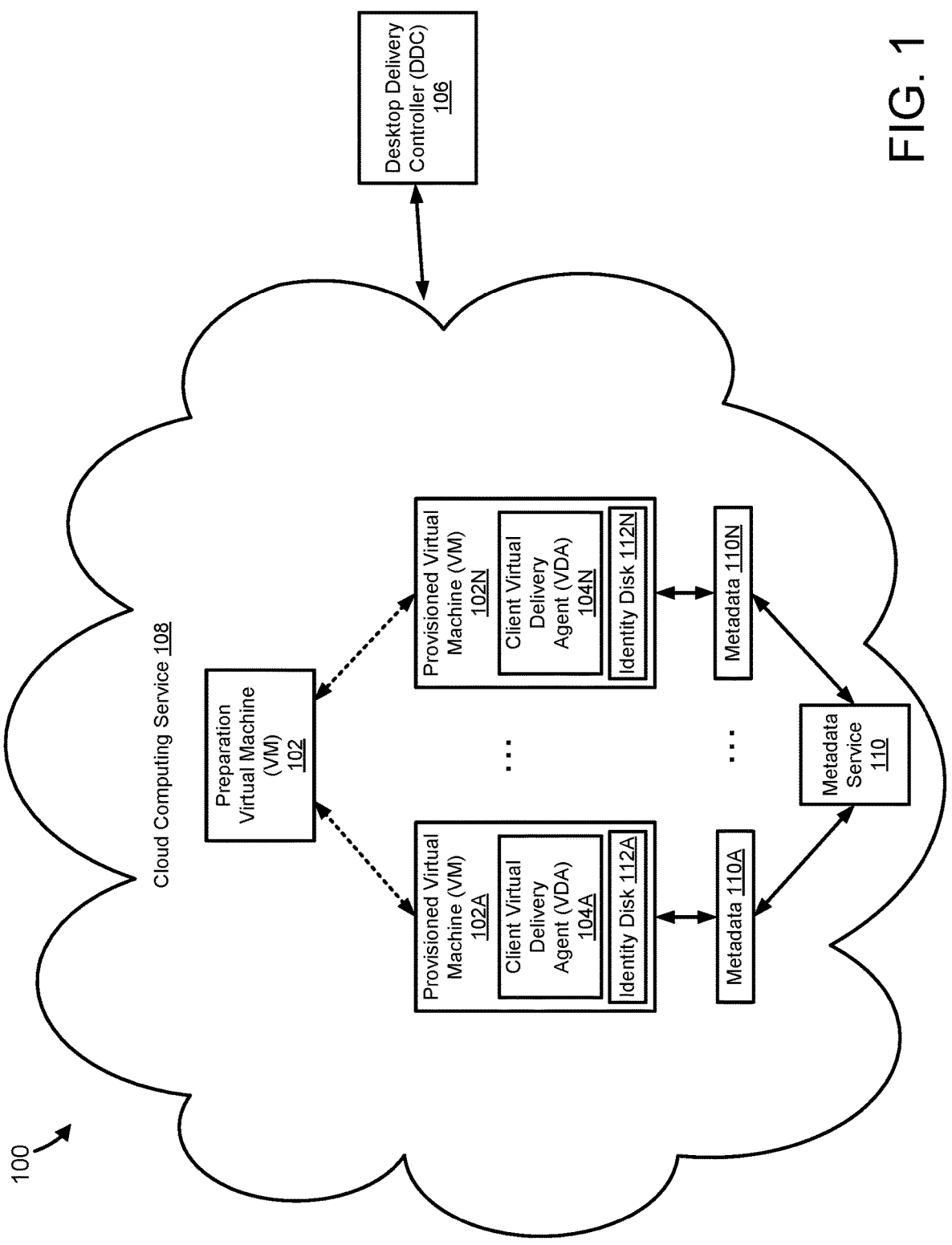
FIG. 1 is a block diagram illustrating a system for initializing a VM image, in accordance with an example of the present disclosure.

As summarized above, various examples described herein are directed to systems and methods to initialize a virtual machine (VM) image. A desktop delivery controller (DDC) can transmit identity data to a metadata service of a cloud computing service, and subsequently the disclosed system, for example a VM during boot, can retrieve the identity data from the cloud computing service and write the identity data to a virtual identity disk assigned to the VM. The system can further encrypt the identity data with a data encryption key (DEK) or a public key of a virtual trusted platform module (vTPM), responsive to the vTPM being available.

When generating a large number of VMs and/or Virtual Delivery Agents (VDAs), a DDC may create a VM image once, and then a cloud computing service may replicate the image multiple times to generate many essentially identical VMs, as described in the example of FIG. 2 below. Each newly provisioned VM can execute an exact copy of the original VM image, which may be referred to as a golden master image.

When provisioning VMs at scale from a common image, each VM must have a unique identity, such as a hostname and/or an identification number, and a record in an Active Directory. The VM may be a member of an Active Directory domain, enabling the VM to access resources, to act within the domain as a computer having the VM's hostname, and the like. Such access could give rise to security issues, for example an attacker could potentially hack into the host or steal secrets, spoof the VM, access the VM's files, and/or access other resources in the domain.

To protect against such security issues, the VM's connection to the domain may be secured using a unique password specific to the VM's hostname. The VM may be required to prove its identity by using the password. For example, the Active Directory may require a password when granting access to any files or resources that the VM has permission to access within the Active Directory. Accordingly, the identity information may include secrets used to protect the VM's identity, so as to prevent attackers from spoofing the VM within the domain or accessing the Active Directory.

Accordingly, it is necessary to create and upload identity information for each individual VM in a way that can be accessed and updated securely by the VM at run time without requiring hypervisor or public cloud service credentials. Moreover, it is necessary to encrypt the identity data for security. In some cases, it is necessary to transfer the identity data securely by creating and uploading a virtual disk formatted as NTFS containing the identity information in access control list (ACL) protected directories. Although such identity data may be compact (for example, occupying less than 20 MB of storage), in some cloud computing service environments, it is necessary to create and upload a disk of the minimum allowed size, for example 1 GB. This process may consume significant CPU resources on the DDC building the images, and may also consume significant network bandwidth to upload. For example, consider the case of provisioning 1,000 VDAs, which would require creating and uploading 1 TB of data. Even if the disk is compressed, such an upload may take significant time, for example 2.5 hours to create and upload 1,000 copies of the identity disk. In addition, such an approach may use public cloud service Application Programming Interfaces (APIs) to perform this operation, which may deliberately throttle the performance of such uploads at scale. For example, in some cloud computing services, a maximum number of simultaneous uploads, such as a maximum of ten uploads, can be performed at any time. In some cases, the cloud service support of a virtual computing service, such as the Citrix Virtual Applications and Desktops Service (CVADS), may throttle the provisioning of identity disks, in order to ensure the DDC and the network are not overloaded. Such throttling can lead to slow provisioning at scale.

Some cloud service environments implement a metadata service that can be used to pass small amounts of data into provisioned VMs. However, in some cases, this metadata service is not used for uploading the identity information. For example, the metadata service may not be used because it may not be writable by the VMs without cloud service credentials. In another example, the metadata service may be insufficiently secure to be used for secrets, as typically any process running in the VM can access it.

The disclosed system and methods can address these issues when initializing a VM image by retrieving identity data from a metadata service of a cloud computing service, and writing the identity data to a virtual identity disk assigned to the VM. The system can encrypt the identity data in order to secure it, for example with a DEK or a public key of a vTPM. The disclosed system and methods can provide advantages over other approaches to initializing a VM image, including by reducing the amount of data that must be transferred, simplifying the VM initialization, and conserving CPU time, network bandwidth, and other computing resources. In particular, updating the metadata service may only require writing the identity data (for example, occupying less than 20 MB of storage), rather than creating and writing the entire disk image, for example 1 GB. In some cases, the identity disk can provide additional uses, for example Shield key pairs/certificates, non-domain-join and MICROSOFT AZURE ACTIVE DIRECTORY (AD) information, or Windows Multiple Activation Key (MAK) information. These additional applications may also be implemented according to the system and methods of creating, populating, securing, and transmitting identity disks and/or identity information disclosed herein.

The systems and processes described herein for initializing a VM image can be implemented within a variety of computing resources. For instance, in some examples, the initialization systems and processes are implemented within a browser and/or a browser extension. Moreover, in some examples, the systems and processes are implemented within a virtualization infrastructure, such as the HDX™ virtualization infrastructure commercially available from Citrix Systems of Fort Lauderdale, Florida, in the United States. In these examples, the initialization systems and processes can be implemented within: a gateway appliance, such as the Citrix Application Delivery Controller™ (ADC); a virtualization agent, and/or other computing resources.

FIG. 1 is a block diagram illustrating a system 100 for initializing a VM image, in accordance with an example of the present disclosure. In this example, the system 100 includes a DDC 106 and a cloud computing service 108.

The DDC 106 can build VM images, such as the provisioned VMs 102A . . . 102N. The DDC 106 can also broker client connections to the VMs 102A . . . 102N and/or the VDAs 104A . . . 104N, for example in response to administrative requests. In some examples, the DDC 106 may be hosted on a server separate from the cloud computing service 108. In some examples, the DDC 106 may be an on-premises DDC that works in tandem with the cloud computing service 108. In another example, the DDC 106 may be hosted on a VM executing within the cloud computing service 108.

The DDC 106 may interoperate with the cloud computing service 108 and/or with the metadata service instances 110A . . . 110N via APIs exposed and/or implemented by the cloud computing service 108.

In some examples, the cloud computing service 108 can be a highly scalable cloud computing service, such as a commercial service. For example, cloud computing service 108 may include MICROSOFT AZURE, GOOGLE CLOUD, ORACLE CLOUD, AMAZON WEB SERVICES, or another commercially available cloud computing service. In other examples, the cloud computing service 108 can include another service, such as an on-premises data center, and is not limited by the present disclosure.

The cloud computing service 108 can be used to host VMs and/or VDAs for users. In this example, the cloud computing service 108 hosts the provisioned VMs 102A . . . 102N. The VMs can host client VDAs, such as the client VDAs 104A . . . 104N of the provisioned VMs 102A . . . 102N, respectively. For example, the client VDAs 104A . . . 104N may refer to client software or instructions executing on the provisioned VMs 102A . . . 102N, respectively. In some cases, the VDAs 104A . . . 104N may be referred to as virtualization agents. Note that a respective VDA, such as VDA 104A, may be a process executed by the corresponding host VM, such as VM 102A, and can support virtualization functions on the respective VM. In some examples of the disclosed system and methods, the respective VDA can also support provisioning functions on the respective VM. In some examples, the respective VDA may execute code to support such functions, for example the VDA may execute code supporting the provisioning functions, as disclosed herein below.

In this example, each of the provisioned VMs 102A . . . 102N has a respective identity disk 112A . . . 112N associated with it. As described herein, the identity disks 112A . . . 112N can store identity information unique to the respective VMs and/or VDAs, including secrets used to protect the respective VM's and/or VDA's identity, hostnames, passwords, and the like. The identity disks 112A . . . 112N may be virtual identity disks. The identity disks 112A . . . 112N can be created, assigned to the VMs and/or VDAs, and populated with the identity information using any of the methods disclosed herein. For example, the VMs 102A . . . 102N and/or VDAs 104A . . . 104N may include code that requests the encrypted identity information from the metadata service 110 when it encounters a blank identity disk, as disclosed herein. Each of the provisioned VMs 102A . . . 102N may also interoperate with a respective metadata service instance 110A . . . 110N, which may include the identity data communicated to the metadata service 110 from the DDC 106 (e.g., via one or more tags in examples directed to MICROSOFT AZURE), as described below. In various examples, this identity data may be held in memory and/or written to storage, such as the identity disks 112A . . . 112N as described further below.

Moreover, the cloud computing service 108 can host a preparation VM 102, which can be involved with creating a DEK and/or with other aspects of preparing or provisioning the hosted VMs 102A . . . 102N and/or VDAs 104A . . . 104N. The preparation VM 102 may be a VM image executed in a special mode of a VM, which may be used to prepare the VM image for production use. In some examples, the preparation VM 102 may create or finalize the VM image from which VMs 102A . . . 102N and/or VDAs 104A . . . 104N are instantiated. In some examples, the preparation VM 102 may be created by the DDC 106 within the cloud computing service 108.

In addition, in some cases, the cloud computing service 108 also includes a metadata service 110. The metadata service 110 can be used to write information that can be read by the provisioned VMs 102A . . . 102N and/or VDAs 104A . . . 104N. For example, each instance of the metadata service 110 may provide an address for such information that is only readable by a particular VM. For example, the VM may interface with a web application at the provided address in order to download the data from the metadata service 110. Alternatively or additionally, the VM may call an API, such as an API of the cloud computing service 108 or a hypervisor. In a typical example, each instance of the metadata service 110 may be configured to pass a small amount of information to a given provisioned VM. In some examples, the information may be passed within a Javascript Objection Notation (JSON) document.

In some cases, each of the VMs may be authorized to read from an associated, corresponding instance of the metadata service 110, but not to write to it, whereas the DDC 106 may be able to write to each instance of the metadata service 110, as shown, for example, in FIGS. 3B and 4 below. For example, a respective VM may be authorized to read from its associated instance of the metadata service 110 without authentication. However, to write to the metadata service, a process outside the cloud computing service 108 (for example, the DDC 106) may be required to present authentication credentials to the cloud computing service 108.

Using the disclosed methods, the system may use the metadata service 110 (e.g., each instance 110A . . . 110N) to temporarily store and/or communicate identity data, which can include secrets, to the provisioned VMs 102A . . . 102N and/or VDAs 104A . . . 104N. Doing so can provide advantages, such as requiring far less communication bandwidth than other methods of initializing VM images, as disclosed herein. However, if a metadata service 110 is not supported by the cloud computing service 108, the system may instead create a formatted identity disk, as described in the example of FIG. 2 below.

In view of the description articulated above, it should be noted that each of the provisioned VMs 102A . . . 102N may have a respective metadata service instance 110A . . . 110N, which may include any data received from the DDC 106. For example, each instance of the metadata service 110A . . . 110N can include the identity data communicated from the DDC 106, metadata, and/or any other data, and is not limited by the present disclosure. Note that the metadata service 110 may provide a respective address for each instance 110A . . . 110N for each respective VM 102A . . . 102N that is only readable by the respective VM, and consequently, the respective metadata service instance 110A . . . 110N is private to the respective VM. In particular, no other VM can read the respective VM's identity data or access its metadata service instance. In some examples, the identity data may be stored in the respective identity disk 112A . . . 112N associated with each provisioned VM 102A . . . 102N, as disclosed herein. However, in some examples, the identity data may be stored elsewhere permanently or temporarily, for example, it may be held in memory before being written to the identity disks 112A . . . 112N. In some examples, any other data received from the respective metadata service instance 110A . . . 110N may also be stored in the respective identity disk 112A . . . 112N and/or stored elsewhere permanently or temporarily, for example, in memory.

Figure 2:
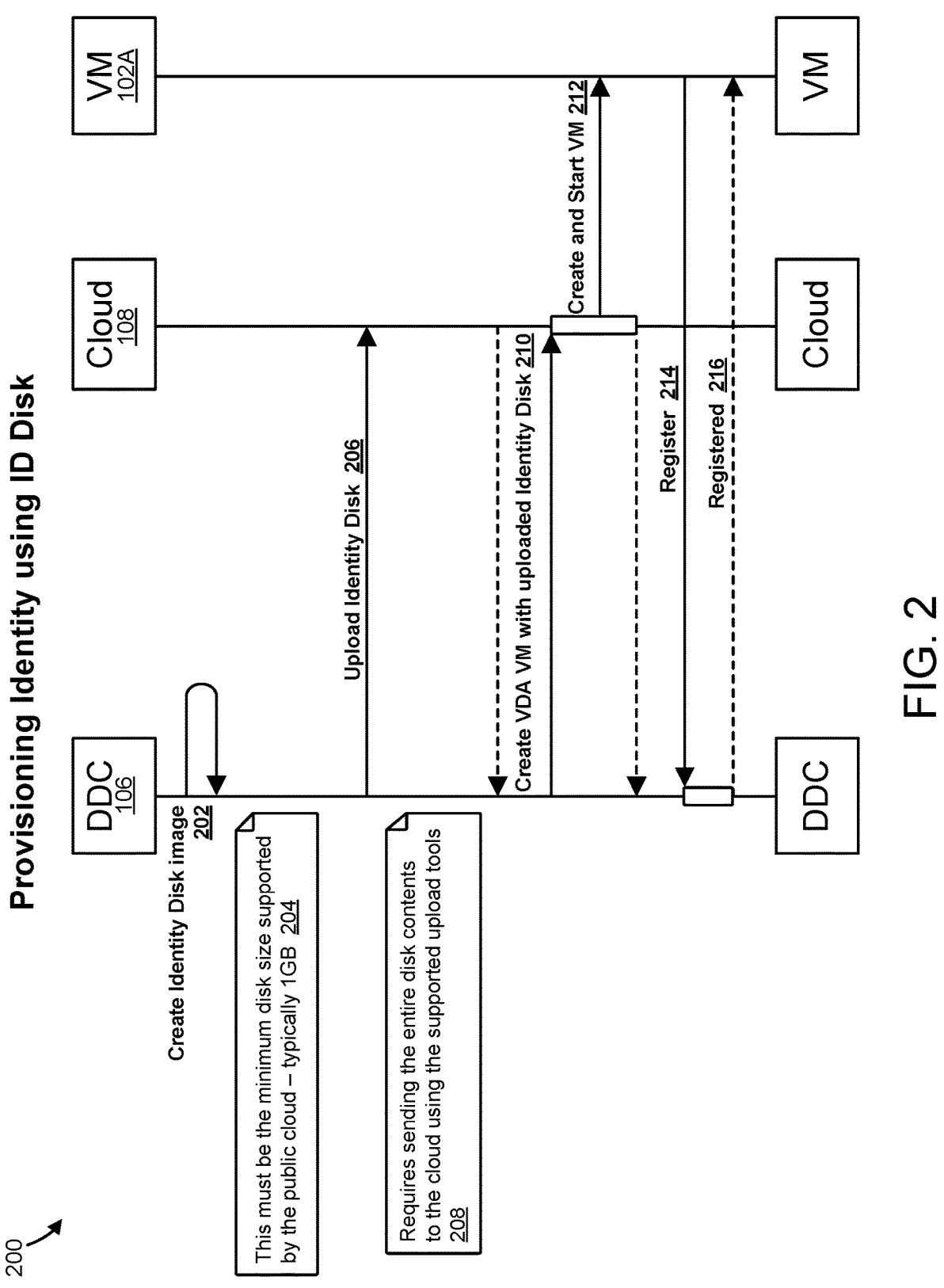
FIG. 2 is a communication flow diagram illustrating a system for initializing a VM image.

FIG. 2 is a communication flow diagram illustrating initializing 200 a VM image. The initializing process 200 may be performed by the DDC 106, the cloud computing service 108, and the provisioned VM 102A. In various examples, the provisioned VM 102A may include any one of the provisioned VMs 102A . . . 102N of the example of FIG. 1, and is not limited by the present disclosure.

At step 202, the DDC 106 can create an identity disk image. Note that the identity disk image must 204 be the minimum disk size supported by the cloud computing service 108. In a typical example, the minimum disk size may be 1 GB. Accordingly, as described previously, creating 202 the identity disk image may consume significant CPU resources on the DDC 106.

At step 206, the DDC 106 can upload the identity disk to the cloud computing service 108. This may require 208 transmitting the entire disk contents to the cloud computing service 108 using the upload tools supported by the cloud computing service 108. For instance, in some examples, the DDC 106 may interoperate with MICROSOFT AZURE (via one or more API calls) to create a template Virtual Hard Disk (VHD) that includes the NTFS format and directories with appropriate ACLs based on the uploaded identity disk image. Also note that this identity disk may be created in addition to a copy of a boot disk for each provisioned VM. Accordingly, as described previously, uploading 206 the identity disk may consume significant network bandwidth.

At step 210, the DDC 106 can instruct the cloud computing service 108 to create the VM 102A to include the uploaded identity disk. For example, the DDC can instruct the cloud computing service 108 by making one or more API calls exposed and implemented by the cloud computing service 108.

At step 212, the cloud computing service 108 can create and start the VM 102A. Every time the provisioned VM 102A is booted, early in the boot process, the VM 102A may read the identity disk and apply the identity information to the running image. Accordingly, by the time the operating system (e.g., MICROSOFT WINDOWS) is loaded, the VM 102A can behave like a unique domain joined computer with a unique hostname.

At step 214, in examples where the VM 102A provides virtualization functions via the DDC 106, the provisioned VM 102A can register with the DDC 106.

At step 216, in examples where the VM 102A provides virtualization functions via the DDC 106, the DDC 106 can confirm that the VM 102A is registered. In these examples, registering the VM 102A with the DDC 106 can enable the DDC 106 to broker client connections to the provisioned VM 102A.

The provisioning process 200 can then end.

Figure 3A:
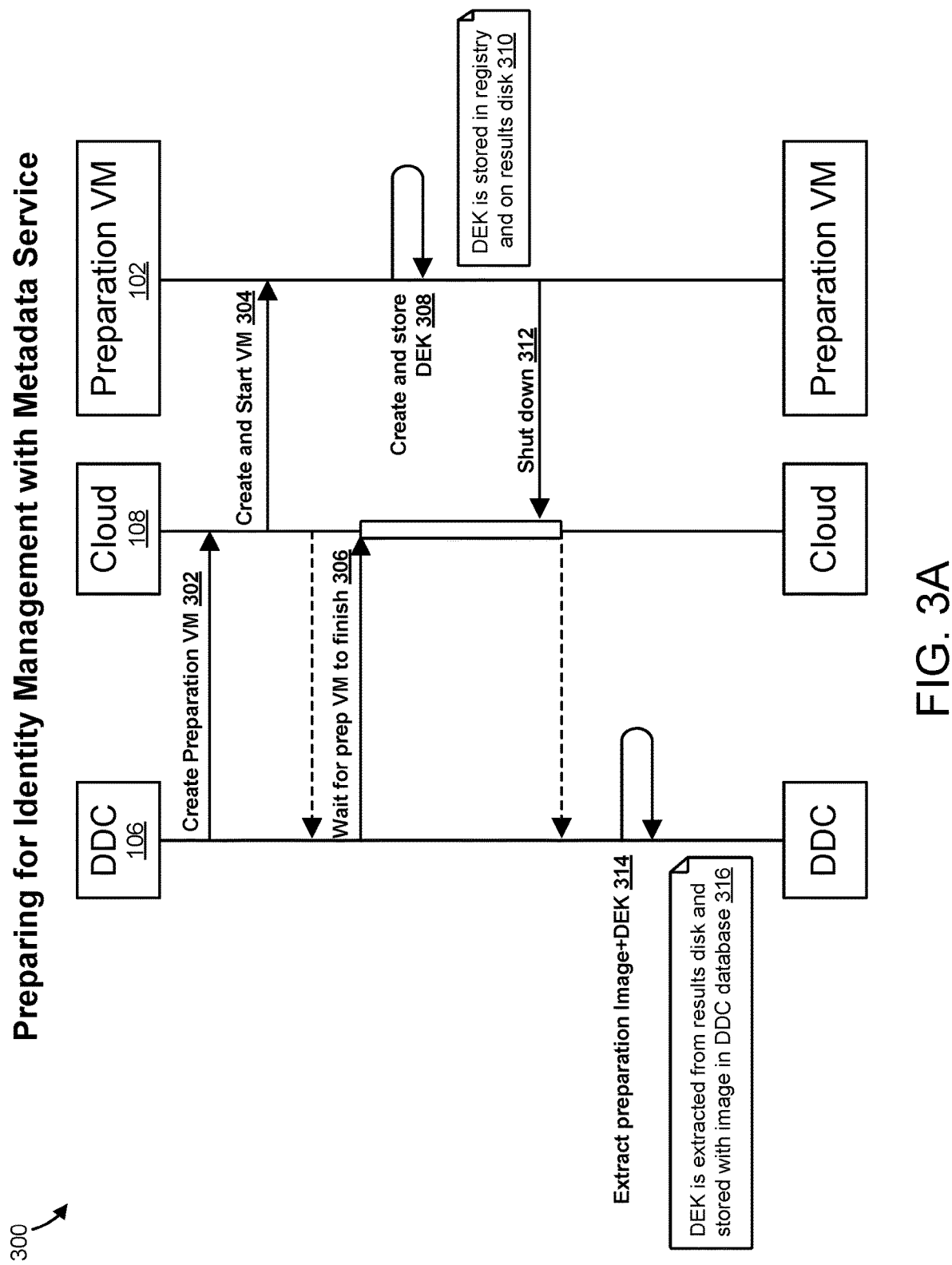
FIG. 3A is a communication flow diagram illustrating preparing for identity management with a metadata service while initializing a VM image, in accordance with an example of the present disclosure.

FIG. 3A is a communication flow diagram illustrating preparing 300 for identity management with a metadata service (e.g., the metadata service 110 of FIG. 1 and/or its instances 110A . . . 110N) while initializing a VM image, in accordance with an example of the present disclosure. The preparation process 300 may involve executing the VM image in a special mode of a VM, which may be referred to as the preparation VM 102, in order to prepare the VM image for production use. Accordingly, the preparation process 300 can be performed by the preparation VM 102, the DDC 106, and the cloud computing service 108. In some examples, the preparation process 300 is needed when preparing for identity management with a metadata service and a DEK, but may not be needed when using a vTPM.

At step 302, the DDC 106 can instruct the cloud computing service 108 to create the preparation VM. For example, the DDC can call APIs of the cloud computing service 108.

At step 304, the cloud computing service 108 can create and start the preparation VM 102.

At step 306, the DDC 106 can wait for the preparation VM to finish its preparation steps of the preparation process 300.

At step 308, the preparation VM 102 can create and store a DEK. In particular, the DEK can be stored 310 in the registry of the master VM image, and on a results disk. In some examples, this registry may be associated with the preparation VM 102. Storing 310 the DEK in the registry of the VM image and results disk will be described further in the example of FIG. 7 below.

At step 312, the preparation VM 102 can shut down. Accordingly, the DDC 106 may finish waiting for the preparation VM.

At step 314, the DDC 106 can extract the preparation image and DEK. The DEK may be extracted from a results disk and stored with the preparation image in the DDC's database. Extracting the DEK from the results disk and storing it with the image in the DDC database will be described further in the example of FIG. 7 below.

Figure 3B:
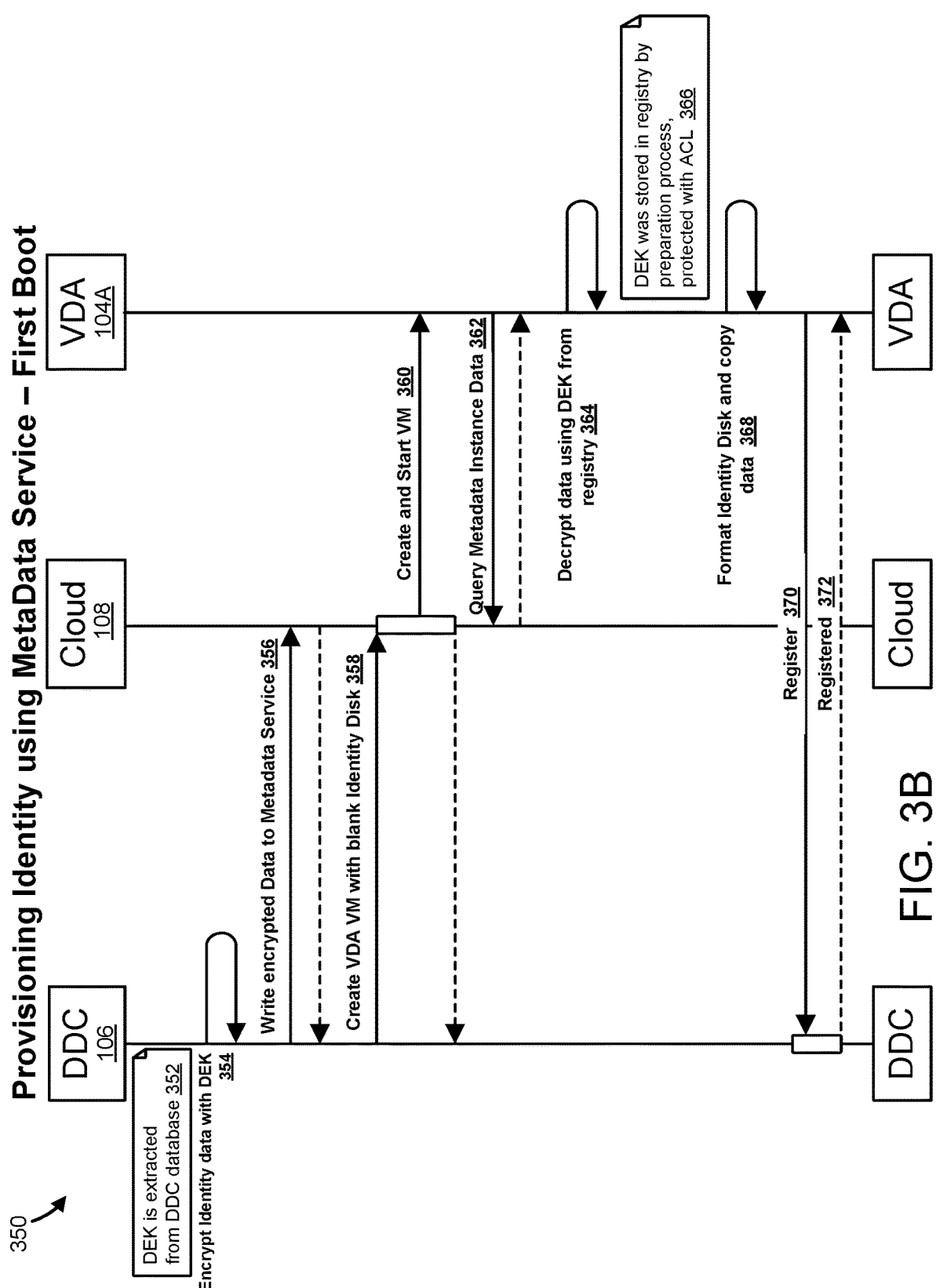
FIG. 3B is a communication flow diagram illustrating provisioning identity information using a metadata service and a data encryption key (DEK) during a first boot while initializing a VM image, in accordance with an example of the present disclosure.

The preparation process 300 can then end, and the system can proceed to provisioning, as illustrated in FIG. 3B.

FIG. 3B is a communication flow diagram illustrating provisioning 350 identity information using a metadata service (e.g., the metadata service 110 of FIG. 1 and/or its instances 110A . . . 110N) and a DEK during a first boot while initializing a VM image, in accordance with an example of the present disclosure. The provisioning process 350 may be performed by the DDC 106, the cloud computing service 108, and the provisioned VDA 104A. In various examples, the provisioned VDA 104A may include any one of the provisioned VDAs 104A . . . 104N of the example of FIG. 1. In some examples, the provisioned VDA 104A may include any process executed by any of the VMs 102A . . . 102N, and is not limited by the present disclosure. The preparation process 350 may be used when provisioning identity information using a metadata service and a DEK. When securing the identity information via a vTPM, the system may instead follow the process 400 of the example of FIG. 4.

At step 352, the DEK can be extracted from the DDC's database. For example, the DEK could be stored in the DDC's database at step 314 of FIG. 3A above. Extracting the DEK from the DDC's database is described further in the examples of FIGS. 5B-5C and 7 below.

The remaining operations 354-368 of the method 350, for encrypting and writing the identity data, creating and starting the VDA, retrieving the identity data, and writing it to an identity disk, will be described further in the example of FIG. 7 below.

At step 354, the DDC 106 can encrypt the identity data with the DEK.

At step 356, the DDC 106 can write the encrypted data to the metadata service of the cloud computing service 108.

At step 358, the DDC 106 can instruct the cloud computing service 108 to create the VDA 104A, and/or the VM hosting the VDA 104A, such as the VM 102A, with a blank identity disk. In an example, creating and attaching the blank identity disk may require virtually no additional resources, such as time or communication.

At step 360, the cloud computing service 108 can create and start the VDA 104A, and/or the VM hosting the VDA 104A, such as the VM 102A.

At step 362, the VDA 104A can execute initialization code that queries the metadata service for the instance data. In some examples, the VDA 104A executes the initialization code early during the boot of the VDA 104A. For instance, in some examples, the VDA 104A executes the initialization code after the network is functioning, but before netlogon runs. In another example, the VDA 104A executes the initialization code prior to other code that attempts to join a virtual domain or virtual network.

At step 364, the VDA 104A can decrypt the data using the DEK from the VM image registry. The DEK may have been stored 366 in the registry by the preparation process 300, and protected with an ACL, as illustrated in FIG. 3A.

At step 368, the VDA 104A can format the identity disk and copy the identity data to the identity disk.

At step 370, the provisioned VDA 104A can register with the DDC 106. Registering the provisioned VDA 104A with the DDC 106 can enable the DDC 106 to broker client connections to the provisioned VDA 104A, for example in response to administrative requests for provisioned desktops.

At step 372, the DDC 106 can confirm that the VDA 104A is registered.

The provisioning process 350 can then end.

Figure 4:
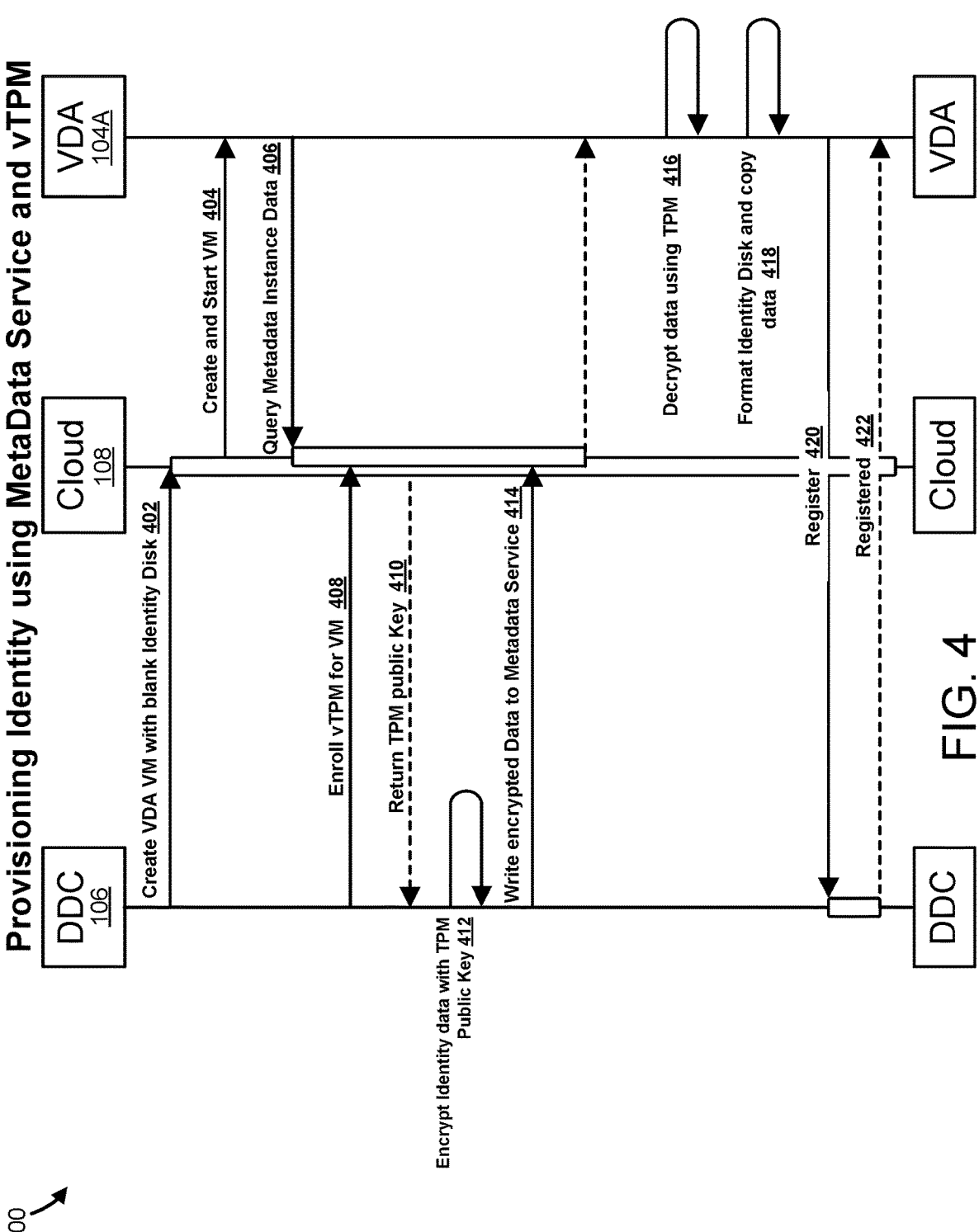
FIG. 4 is a communication flow diagram illustrating provisioning identity information using a metadata service and a virtual trusted platform module (vTPM) while initializing a VM image, in accordance with an example of the present disclosure.

FIG. 4 is a communication flow diagram illustrating provisioning 400 identity information using a metadata service (e.g., the metadata service 110 of FIG. 1 and/or its instances 110A . . . 110N) and a vTPM while initializing a VM image, in accordance with an example of the present disclosure. The provisioning process 400 may be performed by the DDC 106, the cloud computing service 108, and the provisioned VDA 104A. In various examples, the provisioned VDA 104A may include any one of the provisioned VDAs 104A . . . 104N of the example of FIG. 1. In some examples, the provisioned VDA 104A may include any process executed by any of the VMs 102A . . . 102N, and is not limited by the present disclosure. The provisioning process 400 may be used when provisioning identity information using a metadata service and a vTPM. When securing the identity information via a DEK, the system may instead follow the processes 300 and 350 of the examples of FIGS. 3A-3B above.

At step 402, the DDC 106 can instruct the cloud computing service 108 to create the VDA 104A, and/or the VM hosting the VDA 104A, such as the VM 102A, with a blank identity disk. For example, the DDC can instruct the cloud computing service 108 by making one or more API calls exposed and implemented by the cloud computing service 108.

At step 404, the cloud computing service 108 can create and start the VM hosting the VDA 104A. The remaining operations 406-418 of the method 400, for retrieving the identity data, obtaining the vTPM's public key, and protecting the identity data, will be described further in the examples of FIGS. 5B-5C and 8 below.

At step 406, the VDA 104A can execute initialization code that queries the metadata service for the instance data. In some examples, the VDA 104A executes the initialization code early during the boot of the VDA 104A. For instance, in these examples, the VDA 104A executes the initialization code prior to other code that attempts to join a virtual domain or virtual network.

At step 408, the DDC 106 can enroll the vTPM for the VDA 104A, and/or the VM hosting the VDA 104A, such as the VM 102A. For example, the DDC 106 can interoperate with the cloud computing service. For example, the DDC 106 can request the public keys for the vTPM via API calls to the cloud computing service.

At step 410, the cloud computing service 108 can return the vTPM's public key to the DDC 106. For example, the vTPM can return the public keys in response to API calls of the cloud computing service initiated by the DDC 106.

At step 412, the DDC 106 can encrypt the identity data using the vTPM's public key.

At step 414, the DDC 106 can write the encrypted data to the metadata service of the cloud computing service 108. For example, the DDC 106 may possess the necessary authentication credentials from the cloud computing service in order to write the encrypted data to the metadata service.

At step 416, the VDA 104A can decrypt the identity data using the private key of the vTPM. In an example, the VDA 104A can call the vTPM services, which can then use the vTPM's private key in order to decrypt the data, as described further in FIGS. 5C and 8 below.

At step 418, the VDA 104A can format the identity disk and copy the identity data to the identity disk. For example, the VDA 104A may format the identity disk and copy the identity data in response to the identity disk being empty.

At step 420, the provisioned VDA 104A can register with the DDC 106. Registering the provisioned VDA 104A with the DDC 106 can enable the DDC 106 to broker client connections to the provisioned VDA 104A, for example in response to administrative requests for provisioned desktops.

At step 422, the DDC 106 can confirm that the VDA 104A is registered.

The provisioning process 400 can then end.

In some examples, no preparation process based on a preparation VM is needed for identity management with a metadata service and a vTPM. In particular, in the case of a vTPM, a symmetric key is not needed, as the identity data can be protected using vTPM keys, which are unique to each VM. Accordingly, the preparation process to copy and disseminate the DEK is not needed.

Figure 5A:
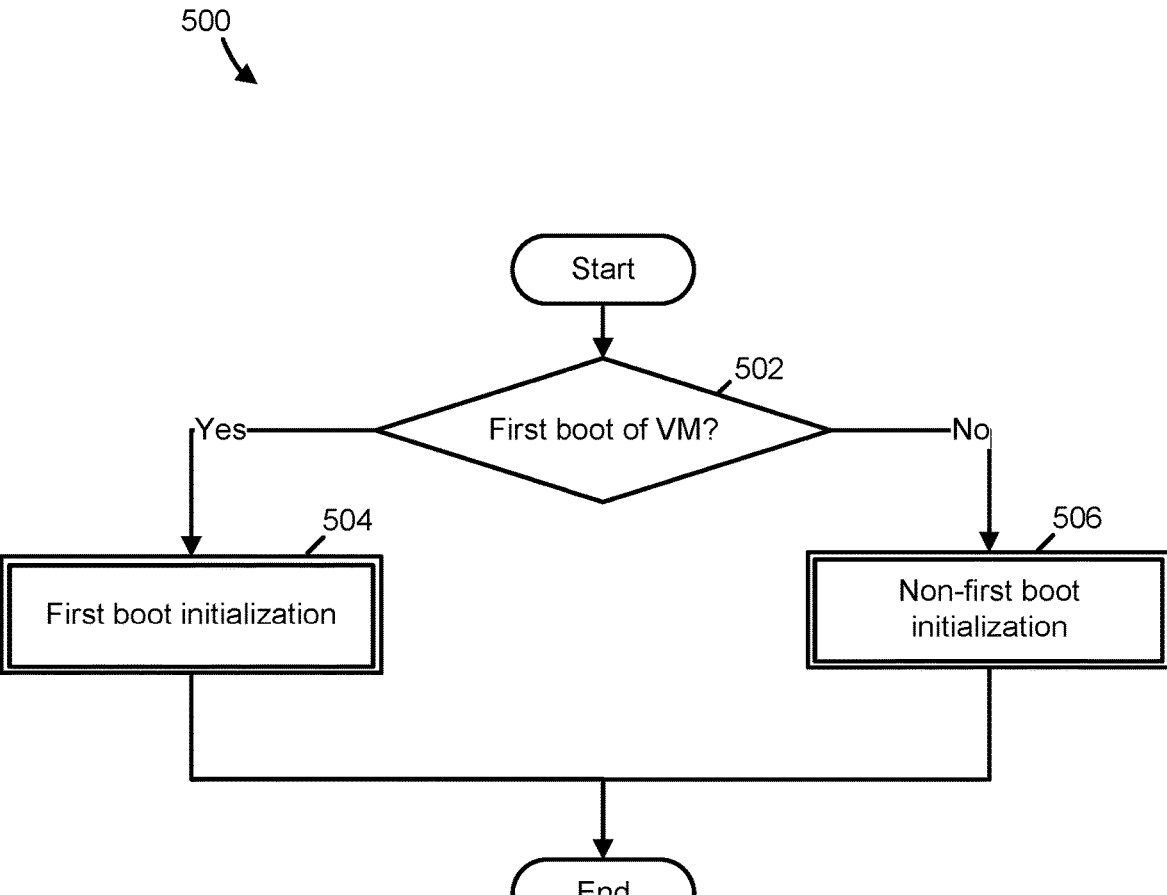
FIG. 5A is a flow diagram of a process for initializing a VM image, in accordance with an example of the present disclosure.

FIG. 5A is a flow diagram of a process 500 for initializing a VM image, in accordance with an example of the present disclosure. In various examples, the process 500 may be implemented by a DDC (e.g., the DDC 106 of FIG. 1) and a cloud computing service (e.g., the cloud computing service 108 of FIG. 1). Alternatively or additionally, the process 500 may be executed during provisioning by a preparation VM and/or a metadata service, or may be implemented within a virtualization infrastructure, as described in the example of FIG. 9 below, and is not limited by the present disclosure.

As shown in FIG. 5A, the process for initializing a VM image starts with determining 502 whether the VM is being booted for the first time.

If the VM is being booted for the first time, the system may perform a first boot initialization procedure 504. Performing a first boot initialization procedure 504 will be described in greater detail in the example of FIG. 5B below.

If the VM is not being booted for the first time, the system may perform a non-first boot initialization procedure 506. Performing a non-first boot initialization procedure 506 will be described in greater detail in the example of FIG. 5D below.

The process 500 can then end.

Figure 5B:
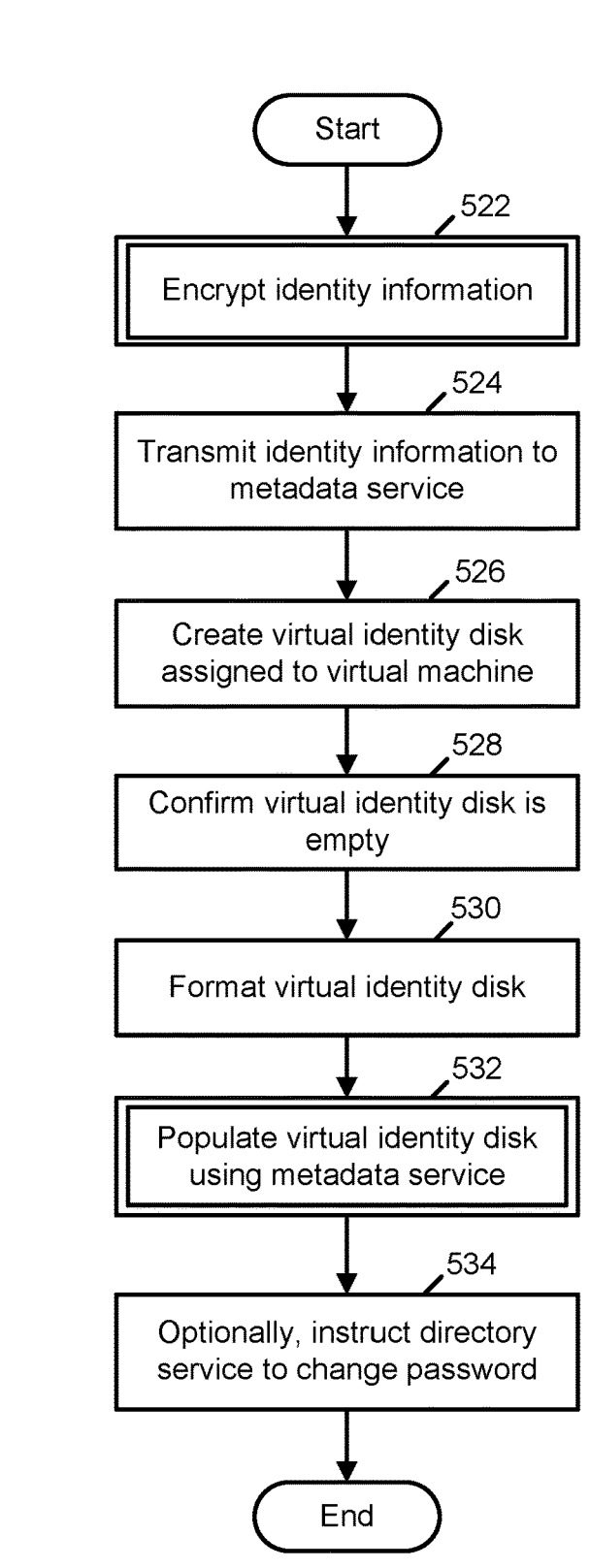
FIG. 5B is a flow diagram of a process for initializing a VM image during a first boot, in accordance with an example of the present disclosure.

FIG. 5B is a flow diagram of a process 504 for initializing a VM image during a first boot, in accordance with an example of the present disclosure. In this example, process 504 may provide additional details of step 504 of the process 500 for initializing a VM image in FIG. 5A. In various examples, the process 504 may be implemented by a DDC (e.g., the DDC 106 of FIG. 1) and a cloud computing service (e.g., the cloud computing service 108 of FIG. 1). Alternatively or additionally, the process 504 may be executed during provisioning by a preparation VM and/or a metadata service, or may be implemented within a virtualization infrastructure, as described in the example of FIG. 9 below, and is not limited by the present disclosure.

In some examples, the process 504 may only be performed for environments (e.g., cloud computing services) that support a metadata service. If a metadata service is not supported, the system may instead create a formatted identity disk, as described in the method 200 of FIG. 2 above.

As shown in FIG. 5B, the process for initializing a VM image during a first boot starts with the DDC encrypting 522 the identity information during provisioning. For example, the identity data may include a hostname and/or an identification number, a record in an Active Directory, a password, for example a password for the Active Directory, and/or other secrets used to protect a VM's identity, and to prevent attackers from spoofing the VM.

In various examples, the identity information may be encrypted using a saved DEK or a public key of a vTPM. The DEK may be a symmetric encryption key, while the vTPM may provide a unique key provisioned for the VM and/or VDA. Encrypting 522 the identity information will be described in greater detail in the examples of FIGS. 6-8 below.

By encrypting 522 the identity information, the DDC can ensure that the identity information, including any secrets, can be transferred and stored securely, thereby preventing attackers from being able to hack into the host, steal secrets, spoof the VM, and/or access resources. Note that, for some cloud computing services, any process executed by the VM is allowed to read from the metadata service. Moreover, for some cloud computing services, any external component with the right authorization can rewrite to the metadata service. However, in some cases, external components are forbidden from reading from the metadata service. Accordingly, encrypting 522 the identity information can be an important step to secure secrets.

Next, the DDC can transmit 524 the identity information to the metadata service during provisioning. As described above, the identity data may include a hostname and/or an identification number, a record in an Active Directory, a password, for example a password for the Active Directory, and/or other secrets. The identity information may be transmitted 524 and/or written to the metadata service in encrypted form.

In some examples, the DDC may transmit 524 the identity information to the metadata service for each VM that is provisioned, in order to secure the identity information. In particular, transmitting 524 the identity information and subsequently deleting it after provisioning each VM may minimize the time that the identity information is present on the metadata service.

In some examples, the DDC may possess the necessary authentication credentials from the cloud computing service in order to write 524 identity data to the metadata service.

In some examples, the operations 526-534 may be performed for each VM provisioned.

Next, the DDC can instruct the cloud service to create 526 a virtual identity disk assigned to a given VM to be provisioned. For example, the virtual identity disk may be hosted by a cloud computing service that also hosts the VM and/or virtualization agent, such as a VDA. The cloud computing service may also host the metadata service, as described in the operation 524 above.

In some examples, the created virtual identity disk may be empty. Accordingly, the DDC can create 526 the virtual identity disk without requiring the upload of any data. In particular, creating 526 and attaching the blank identity disk may consume virtually no additional resources, such as time or communication.

Note that creating 526 an identity disk is also performed during the method 200 of FIG. 2. However, in the disclosed method 504, the system can securely populate the identity disk based on the identity data retrieved from a metadata service. This provides advantages, such as requiring far less communication bandwidth than the method 200.

In some examples, the identity disk can be created 526 by the cloud service from a template VHD that includes the NTFS format and directories with appropriate ACLs. In particular, the VHD may be replicated in the VDA service that formats the identity disk.

Next, while booting, a VM, such as a VDA, can confirm 528 that the virtual identity disk is empty. In some examples, confirming 528 that the virtual identity disk is empty may occur early during the VM's boot process. For example, confirming 528 that the virtual identity disk is empty may occur after the network is functioning, but before netlogon runs.

For example, the VM and/or VDA may use the confirmation 528 that the virtual identity disk is empty in order to determine whether to proceed with provisioning the identity information according to the operations 530-534 below. That is, the system may interpret confirming 528 the virtual identity disk is empty as a signal that the identity information has not yet been downloaded from the metadata service. Accordingly, the system may proceed with the method 504, responsive to the confirmation 528. In some examples, the system only retrieves the identity data from the metadata service after confirming 528 that the identity disk is blank.

Next, the VM and/or VDA can format 530 the virtual identity disk. In some examples, the VM and/or VDA may confirm that the metadata service possesses the identity data before formatting 530 the virtual identity disk.

Next, the VM and/or VDA can populate 532 the virtual identity disk using the identity information from the metadata service. Populating 532 the virtual identity disk will be described in greater detail in the example of FIG. 5C below.

In some examples, populating 532 the virtual identity disk using the identity information from the metadata service may take only seconds, compared to hours to upload the same number of identity disks, using the methods described in the example of FIG. 2. Also note that while populating 532 the virtual identity disk using the identity information from the metadata service may be more resource-efficient, the resulting virtual identity disk may be identical to that of FIG. 2.

Furthermore, in some examples the identity disk only needs to be populated 532 once, for example early during the first boot of the provisioned VM and/or VDA. This can provide the advantage of compatibility, accordingly the disclosed methods can be used with only minimal changes to existing systems, processes, and instructions. At runtime, the identity disk has already been prepared, and therefore all VMs and/or VDAs can be used in the same way, regardless of whether they are hosted by a cloud service providing a metadata service. Likewise, no changes are needed to already-booted VMs and/or VDAs with existing identity disks. In addition, the contents of the identity disk can persist between multiple boots of the VM and/or VDA, and thus can be used by users or processes of the VM and/or VDA to store other data persistently.

Finally, the VM and/or VDA can optionally instruct 534 the directory service to change the password associated with the VM and/or VDA. Thus, while the DDC may continue to possess the password, the password may no longer be valid for the newly provisioned VM and/or VDA.

Performing this operation may improve the security of the newly provisioned VM and/or VDA. For example, changing the password can help safeguard against an attacker reading the DEK from the registry of the VM image, and using the DEK to steal the password of the newly provisioned VM and/or VDA. Note that, for some cloud computing services, any process executed by the VM is allowed to read from the metadata service. Accordingly, instructing 534 the directory service to change the password may be an important step to secure the identity information and any secrets it may contain.

In some examples, the DDC may optionally also delete the identity data from the metadata service when it is no longer needed. Deleting the identity data from the metadata service may safeguard against the identity data being stolen while not actively being used to provision a VM.

In some examples, the DDC may delete the identity data from the metadata service after each VM is provisioned, in order to secure the identity information. In particular, transmitting the identity information and subsequently deleting it after provisioning each VM may minimize the time that the identity information is present on the metadata service.

The process 504 can then end.

Figure 5C:
FIG. 5C is a flow diagram of a process for populating a virtual identity disk using a metadata service while initializing a VM image, in accordance with an example of the present disclosure.
Figure 5C:
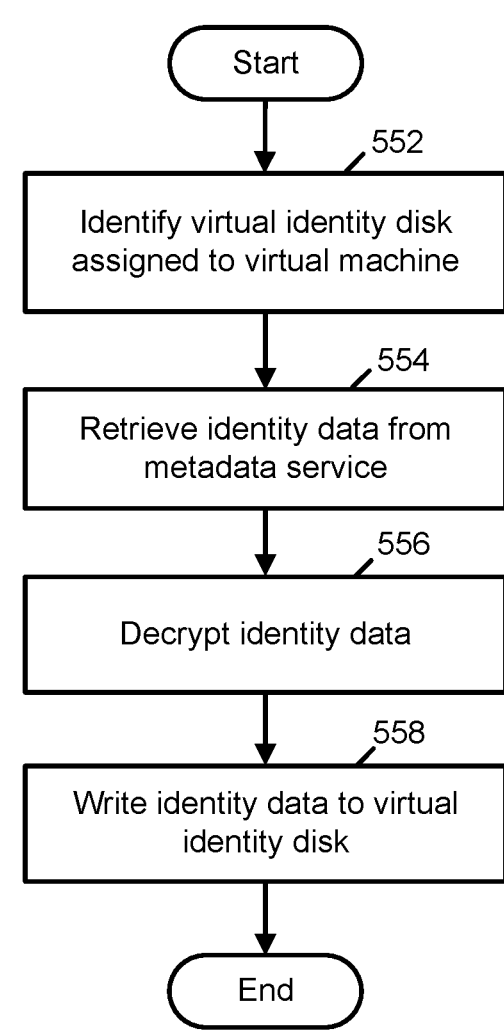

FIG. 5C is a flow diagram of a process 532 for populating a virtual identity disk using a metadata service while initializing a VM image, in accordance with an example of the present disclosure. In various examples, the process 532 may be implemented by a DDC, as in the example of FIG. 1 above. Alternatively or additionally, the process 532 may be executed by a preparation VM, a metadata service, and/or a cloud computing service, or may be implemented within a virtualization infrastructure, as described in the example of FIG. 9 below, and is not limited by the present disclosure.

As shown in FIG. 5C, the process for populating a virtual identity disk starts with the DDC identifying 552 or obtaining a virtual identity disk assigned to a virtual machine. For example, the DDC can instruct the cloud computing service to create the virtual disk.

Next, the VM and/or VDA can retrieve 554 the identity information from the metadata service. As described above, the identity information may typically comprise kilobytes or megabytes of data. Moreover, the metadata service may be hosted by the same cloud computing service as the newly provisioned VM and/or VDA. Accordingly, retrieving 554 the identity information may consume only a small amount of communication bandwidth.

In some examples, the VM and/or VDA may confirm that the metadata service possesses the identity data before retrieving 554 the identity information from the metadata service.

In some examples, retrieving 554 the identity information by the VM and/or VDA may not require authentication. In particular, the VM and/or VDA may be authorized to read from the metadata service without authentication credentials.

In some examples, the identity data is needed very early in the boot process of the VM and/or VDA. Accordingly, the network stack may be required to be functional in time to communicate with the metadata service. The system may need to set an IPv4 address on the network information center (NIC) to enable sending. For example, the system can select an automatic private IP addressing (APIPA) address different from the address used for the metadata service, and can apply the selected address everywhere. In some examples, PVS can do this during early boot, although it sets the real address (obtained from Unified Extensible Firmware Interface (UEFI) networking via Advanced Configuration and Power Interface (ACPI) tables). In some examples, the system can use the same technique to set a fixed address and then remove it, so that the Dynamic Host Configuration Protocol (DHCP) will later obtain the real address.

In some cases, the cloud computing service may provide controls over how the metadata service can be accessed by processes within the VM. Accordingly, the DDC and/or other elements of the disclosed system may set such controls properly to enable the VM to access the identity data. The DDC and/or the VM may set the controls properly by interoperating with the cloud service using the controls expected by the cloud service, thereby instantiate the VM appropriately. In particular, there may be code in the VM image, such as initialization code, that causes the VM to interoperate with the cloud service using these controls.

Next, the VM and/or VDA can 556 decrypt the identity data.

For example, in case the identity data was encrypted with a DEK, the VM and/or VDA can decrypt the data using the DEK from the registry. The VM and/or VDA may be able to obtain the DEK from the registry because the VM and/or VDA may be listed on an ACL used to protect the DEK. In some examples, a provisioning service may obtain the DEK from the registry. Within the VDA, the provisioning or first boot code may use the DEK retrieved from the registry to decrypt the identity data.

Alternatively, if the identity data was encrypted with a public key of a vTPM, the VM and/or VDA can instruct the vTPM service to decrypt the data using the vTPM's private key.

Finally, the VM and/or VDA can write 558 the retrieved identity data to the virtual identity disk.

The process 532 can then end.

Figure 5D:
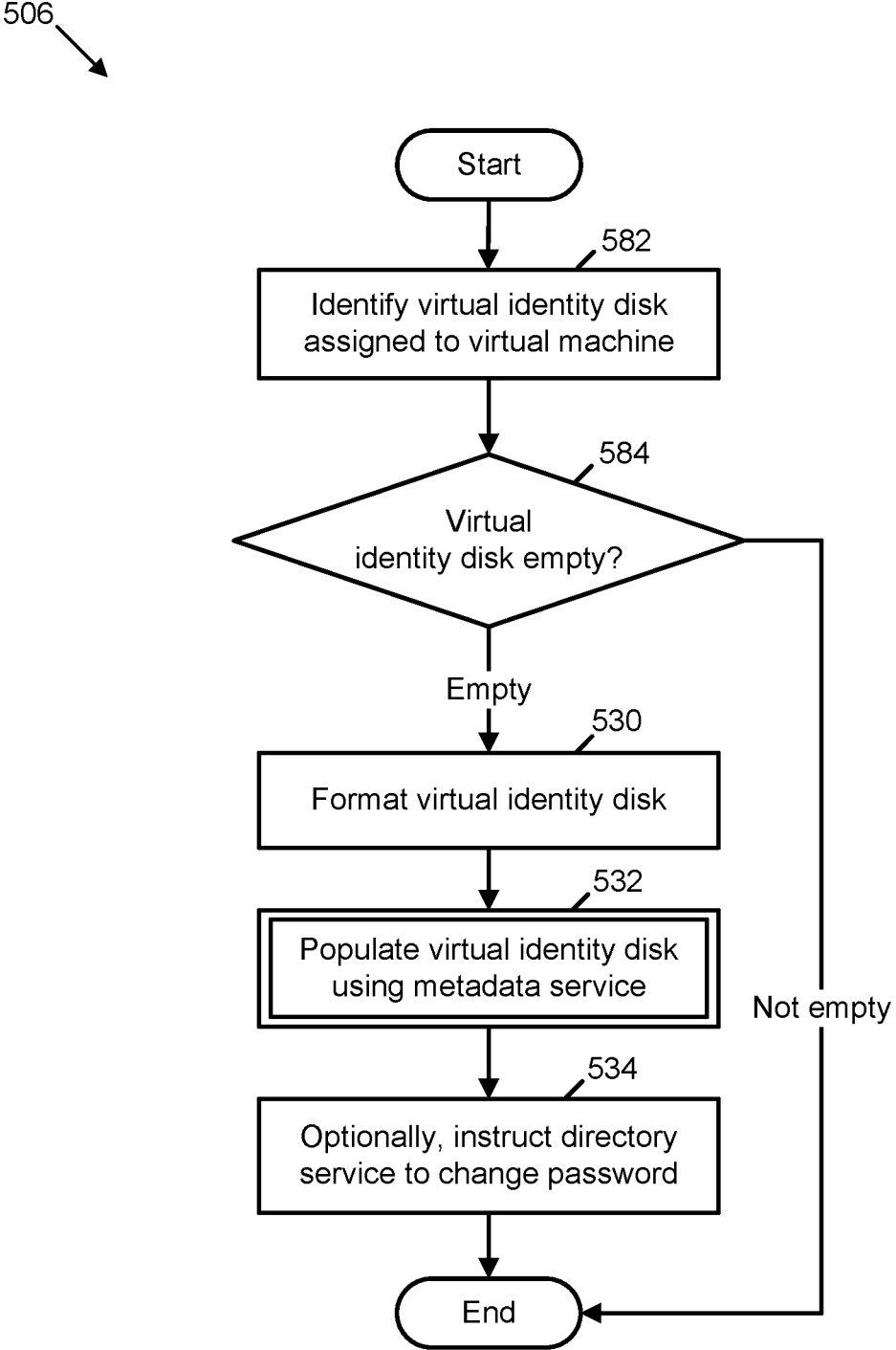
FIG. 5D is a flow diagram of a process for initializing a VM image during a non-first boot, in accordance with an example of the present disclosure.

FIG. 5D is a flow diagram of a process 506 for initializing a VM image during a non-first boot, in accordance with an example of the present disclosure. In this example, the process 506 may provide additional details of step 506 of the process 500 for initializing a VM image in FIG. 5A. In various examples, the process 506 may be implemented by a DDC (e.g., the DDC 106 of FIG. 1) and a cloud computing service (e.g., the cloud computing service 108 of FIG. 1). Alternatively or additionally, the process 506 may be executed during provisioning by a preparation VM and/or a metadata service, or may be implemented within a virtualization infrastructure, as described in the example of FIG. 9 below, and is not limited by the present disclosure.

In some examples, the process 506 may only be performed for environments (e.g., cloud computing services) that support a metadata service. If a metadata service is not supported, the system may instead create a formatted identity disk, as described in the method 200 of FIG. 2 above.

As shown in FIG. 5D, the process for initializing a VM image during a non-first boot starts with the DDC identifying 582 or obtaining a virtual identity disk assigned to the VM. For example, the DDC can identify an existing virtual disk assigned to the VM.

Next, the VM and/or VDA can determine 584 whether the virtual identity disk is empty. Responsive to the virtual identity disk not being empty, the process 506 can end. For example, subsequent to the process 506, the cloud computing service can start the VM, as described in the operation 212 of FIG. 2 above, and the VM can proceed to boot for use by a user.

Next, responsive to the virtual identity disk being empty, the VM and/or VDA can format 530 the virtual identity disk, as in the example of FIG. 5B above. In some examples, the VM and/or VDA may confirm that the metadata service possesses the identity data before formatting 530 the virtual identity disk.

Next, the VM and/or VDA can populate 532 the virtual identity disk using the identity information from the metadata service (provided that the same is available), as in the example of FIG. 5B above. Populating 532 the virtual identity disk was described in greater detail in the example of FIG. 5C above. In some examples, populating 532 the virtual identity disk using the identity information from the metadata service may take only seconds, compared to hours to upload the same number of identity disks, using the methods described in the example of FIG. 2.

Finally, the VM and/or VDA can optionally instruct 534 the directory service to change the password associated with the VM and/or VDA, as in the example of FIG. 5B above. Thus, while the DDC may continue to possess the password, the password may no longer be valid for the newly provisioned VM and/or VDA. Performing this operation may improve the security of the newly provisioned VM and/or VDA. In some examples, the DDC may optionally also delete the identity data from the metadata service when it is no longer needed, for example after each VM is provisioned, which may safeguard against the identity data being stolen while not being used for provisioning.

The process 506 can then end.

Figure 6:
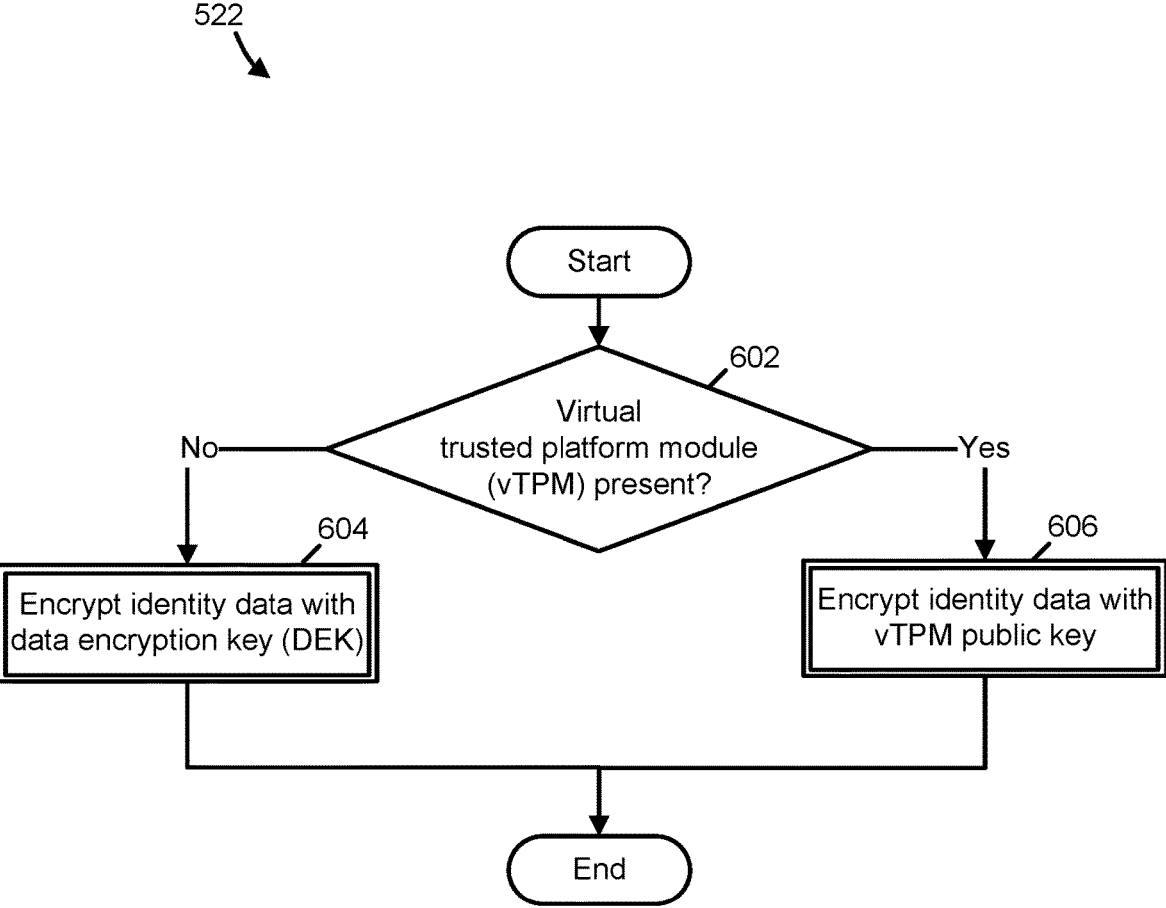
FIG. 6 is a flow diagram of a process for encrypting identity information while initializing a VM image, in accordance with an example of the present disclosure.

FIG. 6 is a flow diagram of a process 522 for encrypting identity information while initializing a VM image, in accordance with an example of the present disclosure. In this example, the process 522 may provide additional details of step 522 of the process 504 for initializing a VM image during a first boot in FIG. 5B. In various examples, the process 522 may be implemented by a DDC, by a preparation service, or by another service executing within a DDC, a VDA, and/or a cloud computing service, as shown in the example of FIG. 1 above. Alternatively or additionally, the process 522 may be executed during provisioning by a preparation VM, a provisioning service, and/or a metadata service, or may be implemented within a virtualization infrastructure, as described in the example of FIG. 9 below, and is not limited by the present disclosure.

As shown in FIG. 6, the process for encrypting identity information while initializing a VM image starts with the DDC determining 602 whether a vTPM is available.

A trusted platform module (TPM) may be a computing device or module that has asymmetric encryption keys integrated into the TPM, and APIs for encrypting and decrypting data using the keys. The keys cannot be removed from the TPM. A vTPM may be a TPM implemented as a VM within a cloud hypervisor environment, such as the cloud computing service 108 of the example of FIG. 1. The vTPM may behave like a hardware TPM from the perspective of a VM executing in the cloud environment, such as the VMs 102A . . . 102N of FIG. 1, but the vTPM may be implemented virtually by the host. If a vTPM is available in a given cloud environment, the disclosed system and methods can use the vTPM to secure the disclosed virtual identity disk, as described herein.

Responsive to a vTPM not being present, the system can then encrypt 604 the identity data using a DEK. For example, the DDC can encrypt 604 the identity data using the DEK. Encrypting 604 the identity data using a DEK will be described in greater detail in the example of FIG. 7 below.

Responsive to a vTPM being present, the system can encrypt 606 the identity data using a public key of the vTPM. For example, the DDC can encrypt 606 the identity data using the public key of the vTPM. Encrypting 604 the identity data using a public key of a vTPM will be described in greater detail in the example of FIG. 8 below.

The process 522 can then end.

Figure 7:
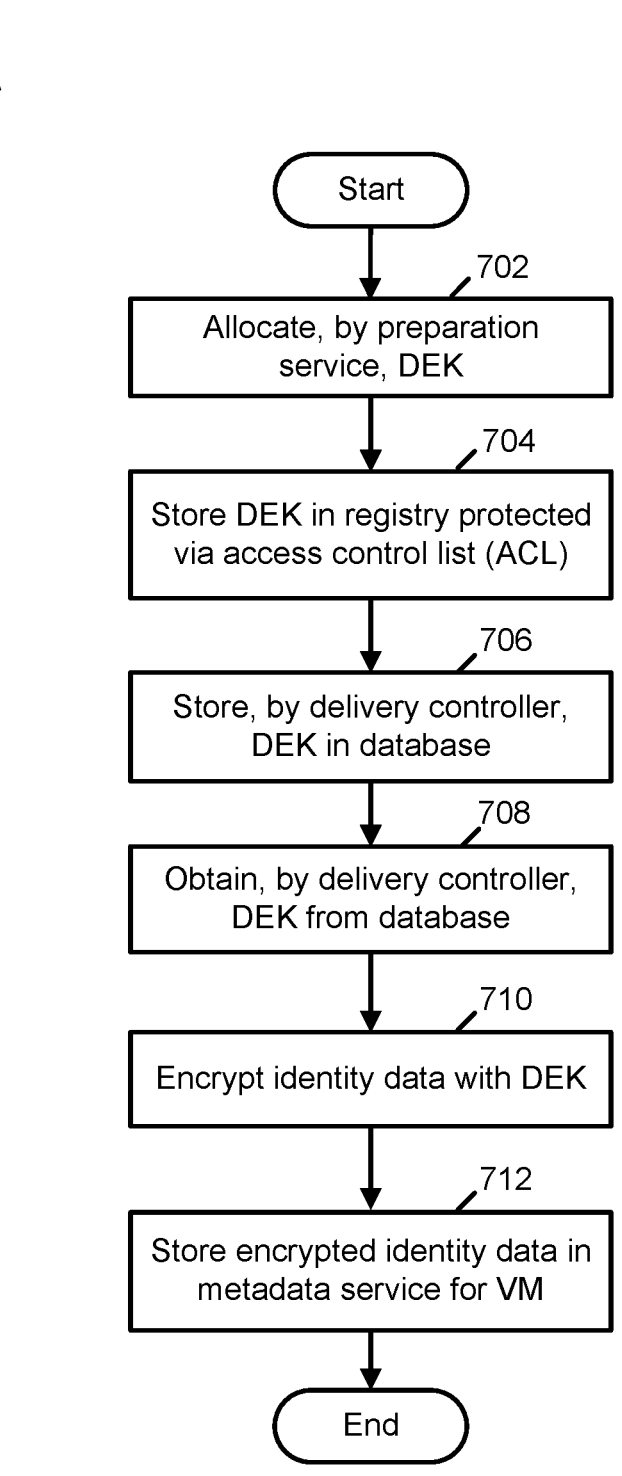
FIG. 7 is a flow diagram of a process for encrypting identity information with a DEK while initializing a VM image, in accordance with an example of the present disclosure.

FIG. 7 is a flow diagram of a process 604 for encrypting identity information with a data encryption key (DEK) while initializing a VM image, in accordance with an example of the present disclosure. In this example, the process 604 may provide additional details of step 604 of the process 522 for encrypting identity information in FIG. 6. In various examples, the process 604 may be implemented by a DDC or by a preparation service or another service executing within a DDC, a VDA, and/or a cloud computing service, as shown in the example of FIG. 1 above. Alternatively or additionally, the process 604 may be executed during provisioning by a preparation VM, a provisioning service, and/or a metadata service, or may be implemented within a virtualization infrastructure, as described in the example of FIG. 9 below, and is not limited by the present disclosure.

As shown in FIG. 7, the process for encrypting identity information with a DEK starts with the preparation service allocating 702 the DEK. The DEK may be a symmetric encryption key, so that the system can use the DEK both to encrypt and decrypt the identity data. For example, the DEK may be an Advanced Encryption Standard (AES) or a similar type of key.

Next, upon completion of preparation, a service executing in the VDA can store 704 the DEK in the registry of the completed golden master disk image. In some examples, this registry may be associated with the preparation VM. The stored DEK may be protected such that it is only accessible by the service and/or by other system software executing in the VDA, similar to the way an ACL may be used to secure an NTFS directory.

In an example, the preparation VM can also write the DEK to a results disk, for example a disk also containing preparation results data. For example, the results disk may be a disk attached to the VM, which enables the preparation code to return results, such as a success or failure status of the preparation process. The disclosed system can also include the DEK on the results disk.

Next, the DDC can store 706 the DEK in a database, for example alongside the image definition. In particular, the DEK may be associated with the image definition, so that when provisioning VMs from the image definition, the DDC can also extract the DEK for use with the identity data.

In an example, when storing 706 the DEK, the DDC may obtain the DEK from the preparation VM, and/or from processes executed by the preparation VM, together with preparation results data. For example, the DDC may extract the DEK from the results disk previously written by the preparation VM, and then store 706 the DEK associated with the image.

Subsequently, when the DDC instructs the cloud service to provision the VM, the DDC can extract 708 the DEK associated with the image definition to be executed from the database. In various examples, this may occur when the DDC boots the VM (e.g., at the VM's first power-on) if deferred provisioning is used, or at the time the DDC creates the VM.

Next, the DDC can encrypt 710 the data using the DEK.

Finally, the DDC may store 712 the encrypted identity data in the metadata service for the VM and/or VDA.

The process 604 can then end.

Figure 8:
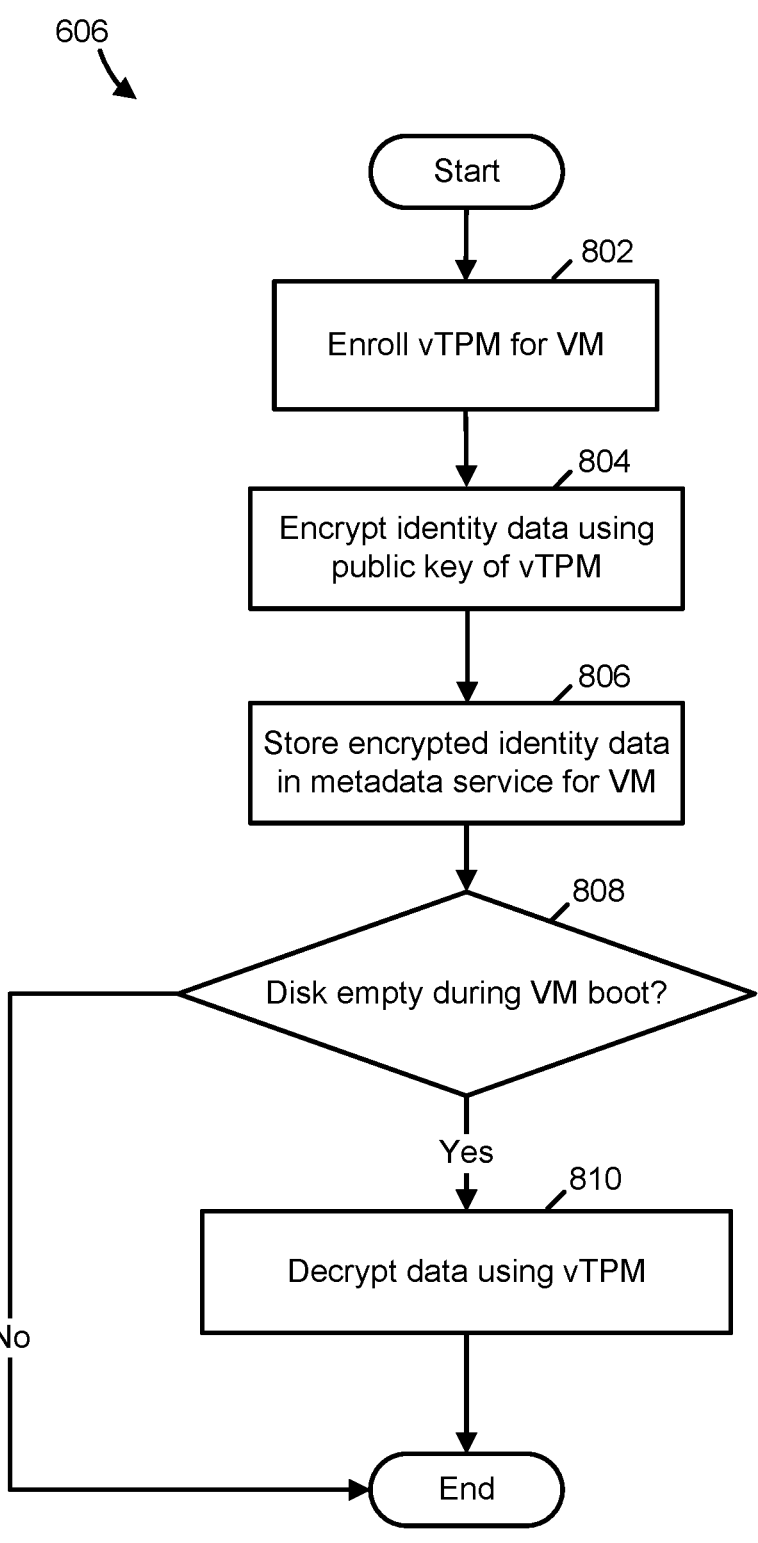
FIG. 8 is a flow diagram of a process for encrypting identity information with a public key of a virtual trusted platform module (vTPM) while initializing a VM image, in accordance with an example of the present disclosure.

FIG. 8 is a flow diagram of a process 606 for encrypting identity information with a public key of a virtual trusted platform module (vTPM) while initializing a VM image, in accordance with an example of the present disclosure. In this example, the process 606 may provide additional details of step 606 of the process 522 for encrypting identity information in FIG. 6. In various examples, the process 606 may be implemented by a DDC or by a preparation service or another service executing within a DDC, a VDA, and/or a cloud computing service, as shown in the example of FIG. 1 above. Alternatively or additionally, the process 606 may be executed during provisioning by a preparation VM, a provisioning service, and/or a metadata service, or may be implemented within a virtualization infrastructure, as described in the example of FIG. 9 below, and is not limited by the present disclosure.

As shown in FIG. 8, the process for encrypting identity information with a public key of a vTPM starts with the DDC or the preparation service enrolling 802 the vTPM for the newly provisioned VM and/or VDA. In an example, the process of enrolling 802 the vTPM can result in the DDC obtaining the public keys for the vTPM in its database. For example, the DDC can obtain the public keys for the vTPM via API calls to the cloud computing service.

Next, the DDC can encrypt 804 the identity data using the public key of the vTPM enrolled for the VM. The vTPM may provide a unique key provisioned for the VM and/or VDA, thereby providing stronger security for the identity data.

In an example, the DDC can encrypt 804 the identity data as a last step in provisioning the VM. For example, after creating the VM in the cloud computing service, the DDC can read the vTPM public key created by the cloud computing service, and encrypt 804 the identity data using the vTPM public key, before continuing with the operation 806.

Next, the DDC can store 806 the encrypted identity data in the metadata service for the VM and/or VDA.

Next, the VM and/or VDA can confirm 808 that the virtual identity disk is empty. For example, the VM and/or VDA may use the confirmation 808 that the virtual identity disk is empty in order to determine whether to proceed with decrypting the identity information. That is, the system may interpret confirming 808 that the virtual identity disk is empty as a signal that the identity information has not yet been downloaded from the metadata service.

Accordingly, the system may format the virtual identity disk and proceed with the operation 810, responsive to the confirmation 808 that the virtual identity disk is empty. Alternatively, responsive to the virtual identity disk not being empty, the process 606 can end.

Finally, the VM, VDA, and/or vTPM services can decrypt 810 the data using the vTPM. For example, the VM and/or VDA can wait (e.g., by looping) until it confirms that the data is present in the metadata service. The VM and/or VDA can then format the identity disk, read the data from the metadata service, and instruct the vTPM to decrypt 810 the data. Note that, in some examples, only the vTPM has access to the vTPM's private key, which must be used to decrypt 810 the data. Accordingly, in an example, the VM and/or VDA can call the vTPM services, which can then use the vTPM's private key in order to decrypt 810 the data. The VM and/or VDA can also write the metadata to the formatted identity disk, as described in FIG. 5C above.

The process 606 can then end.

Computer System Configured to Initialize a VM Image

Figure 9:
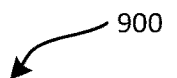
FIG. 9 is a block diagram of an example system for initializing a VM image, in accordance with an example of the present disclosure.

FIG. 9 is a block diagram of an example system 900 for initializing a VM image, in accordance with an example of the present disclosure. The system 900 includes a digital workspace server 902 that is capable of hosting VMs and/or carrying out the methods disclosed herein. An end user's association with the endpoint 906 may exist by virtue of, for example, the end user being logged into or authenticated to the endpoint 906. While only one endpoint 906 and three example application servers 908 are illustrated in FIG. 9 for clarity, it will be appreciated that, in general, the system 900 is capable of hosting connections between an arbitrary number of endpoints and an arbitrary number of application servers. The digital workspace server 902, the endpoint 906, and the application servers 908 communicate with each other via a network 904. The network 904 may be a public network (such as the Internet) or a private network (such as a corporate intranet or other network with restricted access). Other examples may have fewer or more communication paths, networks, subcomponents, and/or resources depending on the granularity of a particular implementation. For example, in some implementations at least a portion of the application functionality is provided by one or more applications hosted locally at an endpoint. Thus references to the application servers 908 should be understood as encompassing applications that are locally hosted at one or more endpoints. It should therefore be appreciated that the examples described and illustrated herein are not intended to be limited to the provision or exclusion of any particular services and/or resources.

In some examples, the DDC may communicate with the digital workspace server 902 and/or with the client virtualization agent 920 or endpoint 906 to perform the methods of initializing a VM image, as disclosed herein.

The digital workspace server 902 is configured to host the server virtualization agent 922. The digital workspace server 902 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain examples. As illustrated in FIG. 9, the digital workspace server 902 includes one or more software programs configured to implement certain of the functionalities disclosed herein as well as hardware capable of enabling such implementation.

As noted above, in certain examples the endpoint 906 can be a computing device that is used by the user. Examples of such a computing device include but are not limited to, a desktop computer, a laptop computer, a tablet computer, and a smartphone. The digital workspace server 902 and its components are configured to interact with a plurality of endpoints. In an example, the end user interacts with a plurality of workspace applications 912 that are accessible through a digital workspace 910, which can serve as a workspace client application. The user's interactions with the workspace applications 912 and/or the application servers 908 may be tracked, monitored, and analyzed by a workspace service. Any microapps can be made available to the user through the digital workspace 910, thereby allowing the user to view information and perform actions without launching (or switching context to) the underlying workspace applications 912. The workspace applications 912 can be provided by the application servers 908 and/or can be provided locally at the endpoint 906. For instance, the example workspace applications 912 include a SaaS application 914, a web application 916, and an enterprise application 918, although any other suitable existing or subsequently developed applications can be used as well, including proprietary applications and desktop applications. To enable the endpoint 906 to participate in a virtualization infrastructure facilitated by the broker computer 924 and involving the server virtualization agent 922 as discussed herein, the endpoint 906 also hosts the client virtualization agent 920.

In some examples, the endpoint 906 can be used by an administrator or user to request provisioned desktops. The administrator or user may access an administrative interface for configuring the workspace system, for example for requesting VMs.

The broker computer 924 is configured to act as an intermediary between the client virtualization agent 920 and the server virtualization agent 922 within the virtualization infrastructure. In some examples, the broker computer 924 registers virtual resources offered by server virtualization agents, such as the server virtualization agent 922. In these examples, the broker computer 924 is also configured to receive requests for virtual resources from client virtualization agents, such as the client virtualization agent 920, and to establish virtual computing sessions involving the client virtualization agent 920 and the server virtualization agent 922.

Computing Device

Figure 10:
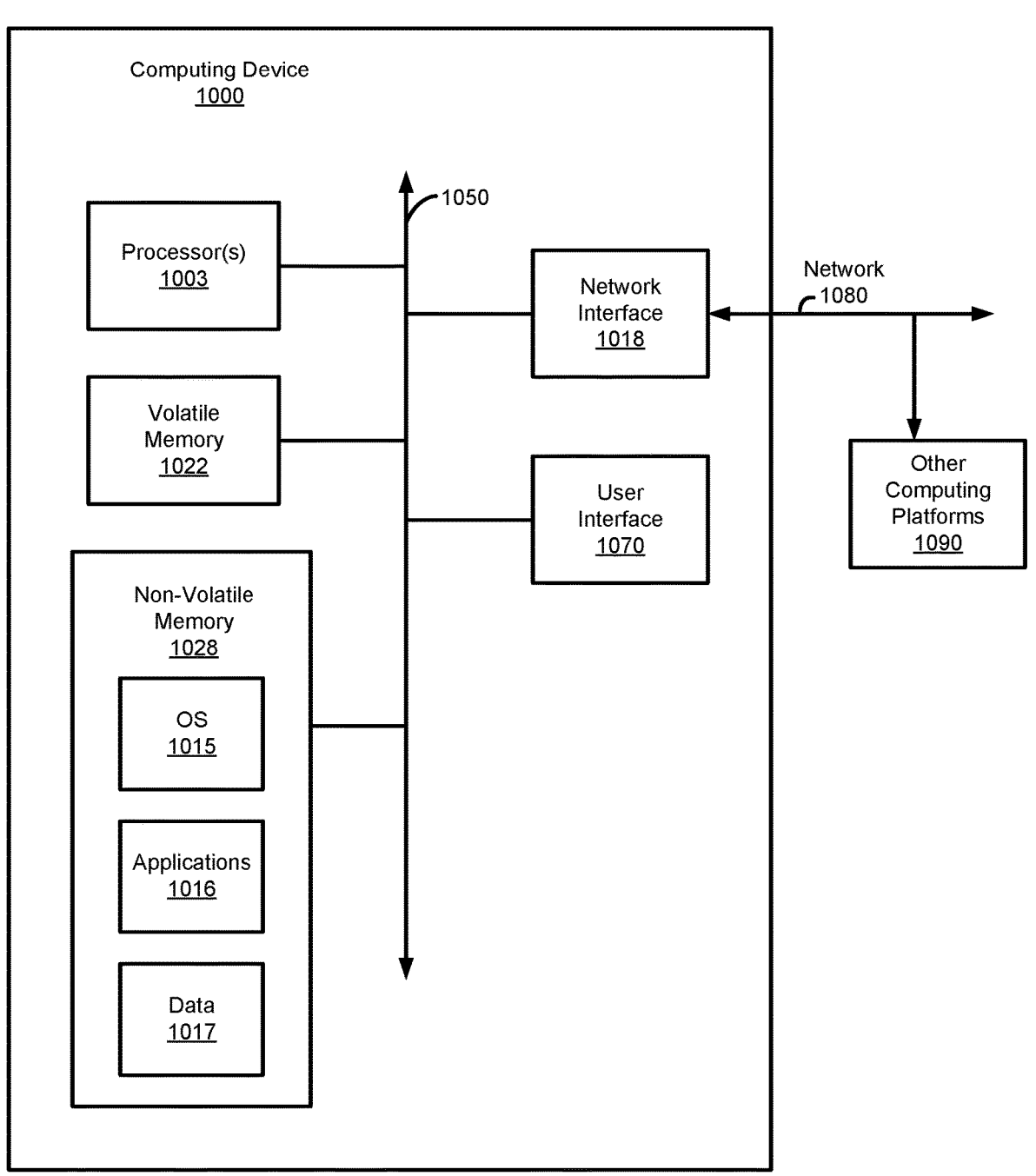
FIG. 10 is a block diagram of a computing device configured to implement various systems and processes in accordance with examples disclosed herein.

FIG. 10 is a block diagram of a computing device configured to implement various systems and processes in accordance with examples disclosed herein.

The computing device 1000 includes one or more processor(s) 1003, volatile memory 1022 (e.g., random access memory (RAM)), non-volatile memory 1028, a user interface (UI) 1070, one or more network or communication interfaces 1018, and a communications bus 1050. The computing device 1000 may also be referred to as a client device, computing device, endpoint device, computer, or a computer system.

The non-volatile (non-transitory) memory 1028 can include: one or more hard disk drives (HDDs) or other magnetic or optical storage media; one or more solid state drives (SSDs), such as a flash drive or other solid-state storage media; and/or one or more hybrid magnetic and solid-state drives. In some embodiments, the computing device 1000 may implement one or more virtual storage volumes, such as a cloud storage, or a combination of such physical storage volumes and virtual storage volumes or arrays thereof.

The user interface 1070 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 1028 stores an OS 1015, one or more applications or programs 1016, and data 1017. The OS 1015 and the application 1016 include sequences of instructions that are encoded for execution by processor(s) 1003. Execution of these instructions results in manipulated data. Prior to their execution, the instructions can be copied to the volatile memory 1022. In some examples, the volatile memory 1022 can include one or more types of RAM and/or a cache memory that can offer a faster response time than a main memory. Data can be entered through the user interface 1070 or received from the other I/O device(s), such as the network interface 1018. The various elements of the device 1000 described above can communicate with one another via the communications bus 1050.

The illustrated computing device 1000 is shown merely as an example client device or server and can be implemented within any computing or processing environment with any type of physical or virtual machine or set of physical and virtual machines that can have suitable hardware and/or software capable of operating as described herein.

The processor(s) 1003 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 1003 can be analog, digital or mixed. In some examples, the processor(s) 1003 can include one or more local physical processors or one or more remotely located physical processors. A processor including multiple processor cores and/or multiple processors can provide functionality for parallel, simultaneous execution of instructions or for parallel, simultaneous execution of one instruction on more than one piece of data.

The network interfaces 1018 can include one or more interfaces to enable the computing device 1000 to access a computer network 1080 such as a Local Area Network (LAN), a Wide Area Network (WAN), a Personal Area Network (PAN), or the Internet through a variety of wired and/or wireless connections, including cellular connections and Bluetooth connections. In some examples, the network 1080 may allow for communication with other computing devices 1090, to enable distributed computing. The network 1080 can include, for example, one or more private and/or public networks over which computing devices can exchange data.

In described examples, the computing device 1000 can execute an application on behalf of a user of a client device. For example, the computing device 1000 can execute one or more virtual machines managed by a hypervisor. Each virtual machine can provide an execution session within which applications execute on behalf of a user or a client device, such as a hosted desktop session. The computing device 1000 can also execute a terminal services session to provide a hosted desktop environment. The computing device 1000 can provide access to a remote computing environment including one or more applications, one or more desktop applications, and one or more desktop sessions in which one or more applications can execute.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A method of initializing a virtual machine (VM) image, comprising:
    retrieving identity data from a metadata service implemented by a cloud environment;
    obtaining, from the cloud environment, a virtual identity disk assigned to a VM;
    writing the identity data to the virtual identity disk assigned to the VM:
    encrypting the identity data comprises encrypting the identity data with a data encryption key (DEK);
    creating the DEK;
    storing a first copy of the DEK in a registry entry of the VM image;
    storing, within a location accessible by a delivery controller, a second copy of the DEK in association with the VM image, wherein encrypting the identity data with the DEK comprises encrypting, by the delivery controller, the identity data using the second copy of the DEK:
    storing, by the delivery controller, the encrypted identity data in the metadata service;
    obtaining, by the VM during a boot, the first copy of the DEK from the registry entry, wherein retrieving the identity data from the metadata service comprises retrieving, by the VM, the encrypted identity data from the metadata service; and
    decrypting, by the VM and during the boot, the encrypted identity data, wherein writing the identity data to the virtual identity disk comprises writing the decrypted identity data to the virtual identity disk.

2. The method of claim 1, wherein encrypting the identity data comprises encrypting the identity data using a public key of a virtual trusted platform module (vTPM).

3. The method of claim 2, wherein:
    encrypting the identity data using the public key of the vTPM comprises encrypting, by a delivery controller, the identity data using the public key of the vTPM; and
    further comprising:
    enrolling, by the delivery controller and with the cloud environment, the vTPM for the VM;
    obtaining, by the delivery controller and from the cloud environment, the public key of the vTPM;
    storing, by the delivery controller, the encrypted identity data in the metadata service for the VM; and
    responsive to the virtual identity disk being empty during a boot of the VM, instructing, by the VM, the vTPM to decrypt the data.

4. The method of claim 2, wherein encrypting the identity data using the vTPM comprises checking for availability of the vTPM, and responsive to the vTPM being available, using the vTPM.

5. The method of claim 1, wherein the identity data comprises a password associated with an account of the VM and/or a unique hostname of the VM.

6. The method of claim 1, further comprising:
    creating the virtual identity disk;
    confirming that the virtual identity disk is empty; and
    formatting the virtual identity disk.

7. The method of claim 1, further comprising transmitting the identity data to the metadata service.

8. The method of claim 1, further comprising instructing a directory service to change a password associated with an account of the VM.

9. A computer system configured to initialize a virtual machine (VM) image, the computer system comprising:
a memory; and
at least one processor coupled to the memory and configured to obtain, from a cloud environment, a virtual identity disk assigned to a VM, wherein the VM is configured to:
retrieve identity data from a metadata service implemented by the cloud environment; and
write the identity data to the virtual identity disk assigned to the VM;
wherein the at least one processor is further configured to:
encrypt the identity data with a data encryption key (DEK);
create the DEK;
store a first copy of the DEK in a registry entry of the VM image;
store, within an accessible location, a second copy of the DEK in association with the VM image, wherein to encrypt the identity data with the DEK comprises to encrypt the identity data using the second copy of the DEK: and store the encrypted identity data in the metadata service; and
wherein the VM is configured, during a boot, to:
obtain the first copy of the DEK from the registry entry; and
decrypt the encrypted identity data, wherein to write the identity data to the virtual identity disk comprises to write the decrypted identity data to the virtual identity disk.

10. The computer system of claim 9, wherein the at least one processor is further configured to encrypt the identity data using a public key of a virtual trusted platform module (vTPM).

11. The computer system of claim 10:
wherein the at least one processor is further configured to:
enroll the vTPM for the VM with the cloud environment;
obtain, from the cloud environment, the public key of the vTPM; and
store the encrypted identity data in the metadata service for the VM; and
wherein the VM is further configured to:
retrieve the encrypted identity data from the metadata service; and responsive to the virtual identity disk being empty during a boot, instruct the vTPM to decrypt the data.

12. The computer system of claim 9, wherein:
the at least one processor is further configured to create the virtual identity disk; and
the VM is further configured to:
confirm that the virtual identity disk is empty; and
format the virtual identity disk.

13. A non-transitory computer readable medium storing executable sequences of instructions to initialize a virtual machine (VM) image, the sequences of instructions comprising instructions to:
retrieve identity data from a metadata service implemented by a cloud environment; and
write the identity data to a virtual identity disk assigned to a VM, wherein a delivery controller is configured to obtain, from the cloud environment, the virtual identity disk assigned to the VM;
wherein the sequences of instructions further comprise instructions to:
encrypt the identity data with a data encryption key (DEK);
create the DEK:
store a first copy of the DEK in a registry entry of the VM image;
store, within an accessible location, a second copy of the DEK in association with the VM image, wherein to encrypt the identity data with the DEK comprises to encrypt the identity data using the second copy of the DEK: and
store the encrypted identity data in the metadata service; and
wherein the VM is configured, during a boot, to:
obtain the first copy of the DEK from the registry entry; and
decrypt the encrypted identity data, wherein to write the identity data to the virtual identity disk comprises to write the decrypted identity data to the virtual identity disk.

14. The non-transitory computer readable medium of claim 13, wherein:
the data encryption key (DEK) is from a virtual trusted platform module (vTPM).

15. The non-transitory computer readable medium of claim 13, wherein the identity data comprises a password associated with an account of the VM and/or a unique hostname of the VM.

* * * * *